United States Patent
Tungare

(10) Patent No.: US 9,342,673 B2
(45) Date of Patent: May 17, 2016

(54) METHOD FOR USER AUTHENTICATION IN A DEVICE COMPRISING A TOUCH SCREEN

(71) Applicant: MOTOROLA SOLUTIONS, INC, Schaumburg, IL (US)

(72) Inventor: Aroon V Tungare, Winfield, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 33 days.

(21) Appl. No.: 14/225,646

(22) Filed: Mar. 26, 2014

(65) Prior Publication Data

US 2015/0278492 A1    Oct. 1, 2015

(51) Int. Cl.
G06F 21/31    (2013.01)
G06F 21/36    (2013.01)

(52) U.S. Cl.
CPC ............... *G06F 21/31* (2013.01); *G06F 21/36* (2013.01); *G06F 21/316* (2013.01); *G06F 2221/2133* (2013.01)

(58) Field of Classification Search
CPC ....... G06F 21/31; G06F 21/36; G06F 316/36; G06F 2221/2133
USPC .................................................. 713/182, 183
See application file for complete search history.

(56) References Cited

U.S. PATENT DOCUMENTS

| | | | |
|---|---|---|---|
| 5,754,652 A | 5/1998 | Wilfong | |
| 6,209,104 B1 * | 3/2001 | Jalili | 726/18 |
| 6,658,574 B1 | 12/2003 | Anvekar | |
| 6,904,526 B1 | 6/2005 | Hongwei | |
| 6,980,081 B2 * | 12/2005 | Anderson | 340/5.53 |
| 7,441,122 B2 * | 10/2008 | Plagne | 713/182 |
| 7,616,764 B2 * | 11/2009 | Varghese et al. | 380/255 |
| 7,734,929 B2 * | 6/2010 | Debrito | 713/184 |

(Continued)

FOREIGN PATENT DOCUMENTS

| | | |
|---|---|---|
| CA | 2807818 A1 | 3/2012 |
| FR | 2 980 012 A1 | 3/2013 |

(Continued)

OTHER PUBLICATIONS

David Aspinall et al. "'Give Me Letters 2, 3, and 6!' Partial Password Implementations & Attacks" Proceedings of the 17th International Conference on Financial Cryptography & Data Security, Apr. 2013 (18 pages) http://groups.inf.ed.ac.uk/security/passwords/pps.pdf.*

(Continued)

*Primary Examiner* — Joseph P Hirl
*Assistant Examiner* — Thomas Gyorfi

(57) ABSTRACT

A method for user authentication in a device comprising a touch screen is provided. In operation, the device stores a user authentication code corresponding to a user. When a trigger for user authentication is detected, the device randomly selects one or more character positions in the sequence of characters. The device further requests the user to enter a character corresponding to each of the selected one or more character positions in the sequence of characters. When the device detects a user entry made using a keypad on the touch screen, the device determines whether the user entry matches a character corresponding to each of the selected one or more character positions. When the user entry matches a character corresponding to each of the selected one or more character positions in the sequence of characters, then the user is successfully authenticated to the device.

11 Claims, 4 Drawing Sheets

(56) References Cited

U.S. PATENT DOCUMENTS

| | | | |
|---|---|---|---|
| 7,747,868 B2* | 6/2010 | Park | 713/183 |
| 8,006,300 B2* | 8/2011 | Mizrah | G06F 21/36 726/18 |
| 8,453,221 B2* | 5/2013 | Danielsen et al. | 726/6 |
| 8,515,068 B2 | 8/2013 | Brown et al. | |
| 8,520,848 B1 | 8/2013 | Liu et al. | |
| 2002/0078350 A1 | 6/2002 | Sandhu et al. | |
| 2003/0182558 A1 | 9/2003 | Lazzaro et al. | |
| 2004/0123160 A1* | 6/2004 | Mizrah | 713/202 |
| 2005/0171851 A1 | 8/2005 | Applebaum et al. | |
| 2007/0250920 A1 | 10/2007 | Lindsay | |
| 2011/0050394 A1* | 3/2011 | Zhang et al. | 340/5.82 |
| 2011/0060912 A1 | 3/2011 | Dai | |
| 2014/0115670 A1* | 4/2014 | Barton et al. | 726/4 |

FOREIGN PATENT DOCUMENTS

| | | |
|---|---|---|
| WO | 2006006182 A2 | 1/2006 |
| WO | 2011157754 A2 | 12/2011 |

OTHER PUBLICATIONS

Sethi et al., User Authentication on Mobile Devices: pp. 1-28.

Anonymous, "Partial Password—Wikipedia, the free encyclopedia," Jan. 7, 2014, Retrieved from the Internet URL:http://en.wikipedia.org/wiki/Partial_Password, retrieved on Apr. 30, 2015, pp. 1-1.

International Search Report and Written Opinion for corresponding International Patent Application No. PCT/US2015/017914, mailed on Aug. 3, 2015.

* cited by examiner

FIG. 3A — ENTER 3RD DIGIT OF YOUR PIN

FIG. 3B — ENTER 4TH DIGIT OF YOUR PIN

FIG. 3C — ENTER SUM OF 3RD AND 4TH DIGIT OF YOUR PIN

FIG. 3D — ENTER IN SEQUENCE, 3RD, 4TH, 1ST, 2ND DIGITS OF YOUR PIN

FIG. 3E — ENTER YOUR PIN IN REVERSE

FIG. 3F — ENTER 1ST AND 4TH DIGIT OF YOUR PIN SIMULTANEOUSLY

METHOD FOR USER AUTHENTICATION IN A DEVICE COMPRISING A TOUCH SCREEN

BACKGROUND OF THE INVENTION

Consumer and enterprise devices such as smart phones and mobile computers hold a large amount of proprietary information including personal and business critical data. To protect such devices from unauthorized use, a password is typically required to authenticate a user with the device. Most devices typically require a three (3) or four (4) digit numeric or alphanumeric codes. While longer and more secure passwords are desirable, the difficulty of entering elaborate passwords in handheld devices leads most users to opt for simpler passwords with fewer digits.

Electronic devices may employ touch screens as a user interface for user interaction with the electronic device such as to present information to a user and also receive input from the user. User interactions, for example, may include entering security information such as passwords to access the electronic device and/or accounts within the electronic device. Users may use their fingers and/or another physical mechanism such as a stylus to interact with the touch screen, which may leave identifying marks on the surface of the touch screen. These marks can be inferred as the recently touched areas of the screen and therefore may unintentionally reveal the security information (e.g. password) to other users. In this manner, an unauthorized user may then be able to interpret the pattern of the identifying marks on the surface of the touch screen. Accordingly, there is a need for an improved mechanism to protect such devices from unauthorized use.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 3A through 3F show examples of different authentication challenges provided to a user for entering a user authentication code on a touch screen during user authentication process in accordance with some embodiments.

Figure 1:
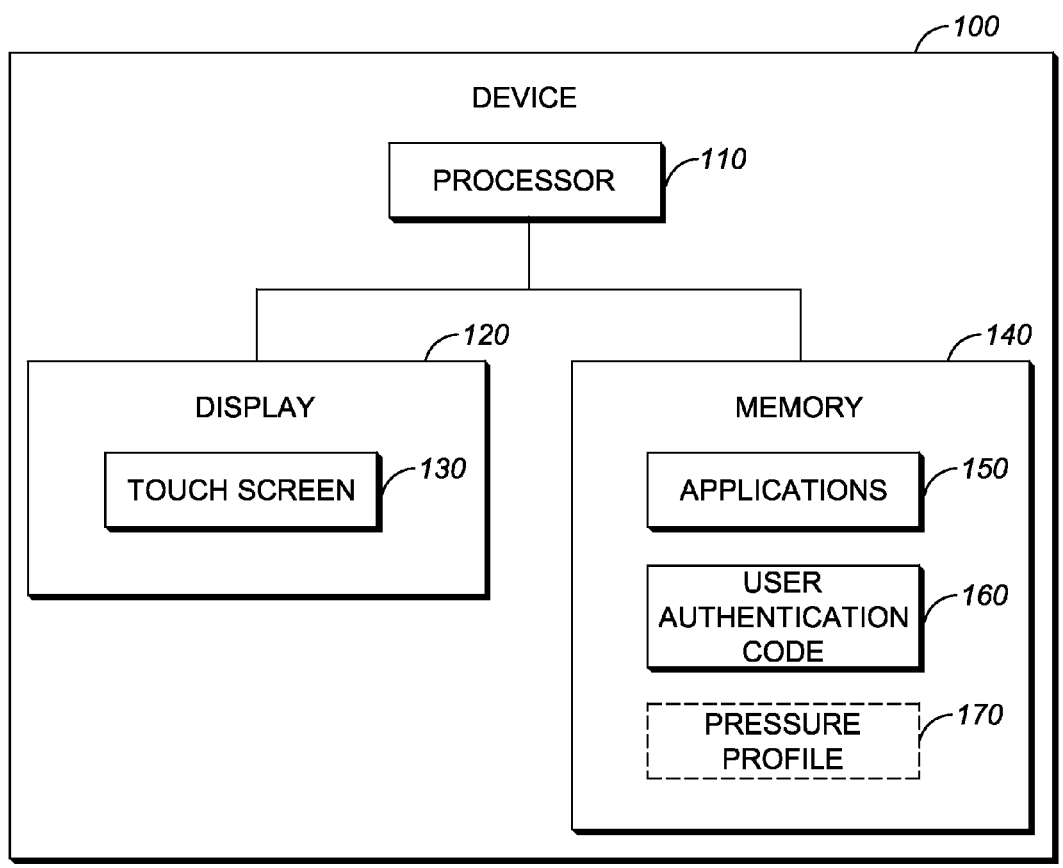
FIG. 1 is a block diagram of a device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A method for user authentication in a device comprising a touch screen is provided. In operation, the device stores a user authentication code corresponding to a user. The user authentication code comprises a sequence of characters each associated by a position. When a trigger for user authentication is detected, the device randomly selects one or more character positions. The device further requests the user to enter a character corresponding to each of the selected one or more character positions. When the device detects a user entry made using a keypad on the touch screen, the device determines whether the user entry matches a character corresponding to each of the selected one or more character positions in the sequence of characters. When the user entry matches a character corresponding to each of the selected one or more character positions in the sequence of characters, the user is successfully authenticated to the device.

FIG. 1 is a block diagram of a device 100 in which methods and components required for user authentication process is implemented in accordance with the embodiments. The device 100 may take form of, but are not limited to, a desktop computer, handheld devices such as a cellular telephone, smart telephone, tablet, mobile computer, personal digital assistant and the like, two-way radio, a laptop or notebook computer, an automated teller machine, a kiosk, a vending machine, a payment machine, facsimile machine, and the like. Embodiments can be advantageously implemented to obscure security entries entered on the device 100 during user authentication process. Embodiments can be implemented in any electronic device performing user authentication using touch surfaces.

The device 100 comprises a processor 110, a display 120 comprising at least a touch screen 130, and memory 140. The processor 110 runs or executes operating instructions or programs that are stored in the memory 140 to perform various functions for the device 100 and to process data. The processor 110 includes one or more microprocessors, microcontrollers, digital signal processors (DSP), state machines, logic circuitry, or any device or devices that process information based on operational or programming instructions stored in the memory 140. In accordance with the embodiments, the processor 110 processes various functions and data associated with carrying out the user authentication process.

The display 120 may be realized as an electronic display configured to graphically display information and/or content under the control of the processor 110. Depending on the implementation of the embodiment, the display 120 may be realized as a liquid crystal display (LCD), a touch-sensitive display, a cathode ray tube (CRT), a light emitting diode (LED) display, an organic light emitting diode (OLED) display, a plasma display, a projection display, or another suitable electronic display.

The touch screen 130 provides a user interface, i.e. both an input interface and an output interface between the device 100 and a user. The touch screen 130 has a touch-sensitive surface, sensor, or set of sensors that accepts input from the user based on haptic and/or tactile contact. The touch screen 130 can be operated on by an input device (such as a finger of a user or other input device such as a stylus) to provide touch sensitive inputs to the device 100. In accordance with some embodiments, the touch screen 130 has a virtual keypad or keyboard that comprises a plurality of graphical keys arranged in a predetermined layout (for example, QWERTY keyboard or numeric/alpha numeric keypads) to allow the user to tap or touch the keys in a sequence to provide inputs to the device 100. Although the block diagram of FIG. 1 shows touch screen 130 to be an integral part of the display 120, in one embodiment, the device 100 can include a display 120 that is separated from the touch screen 130. In general, the term "touch screen" used throughout the description represents any touch sensitive surface or panel that can be used to receive input during user authentication process on a device 100.

The memory 140 can be an IC (integrated circuit) memory chip containing any form of RAM (random-access memory), a CD-RW (compact disk with read write), a hard disk drive, a DVD-RW (digital versatile disc with read write), a flash memory card, external subscriber identity module (SIM) card or any other non-transitory medium for storing digital information. The memory 140 comprises applications 150, authentication information such as a user authentication code 160 stored corresponding to one or more users, and optionally a pressure profile 170. The applications 150 include various software and/or firmware programs necessary for the operation of the device 100 as well as software and/or firmware programs (e.g. banking, email applications etc.) that address specific requirements of the user. In accordance with embodiments, the device 100 initiates a user authentication process prior to providing access to one or more applications 150 for the user. In one embodiment, the device 100 remains in a locked state, wherein access to any of the applications 150 is restricted unless the user unlocks the device 100 by successfully completing the user authentication process. In one embodiment, the device 100 remains in an unlocked state, wherein users will have access to a first set of the applications 150 and functions required for the general operation of the device 100 while access to a second set of the applications 150 and functions (or specific functions of a particular one of the applications 150) is restricted until the user successfully completes the user authentication process. During the user authentication process, the device 100 challenges the user by prompting the user to enter user authentication code 160 according to randomly selected character positions. When the device 100 detects user input of the characters according to the selected character positions in a correct order, then the device 100 successfully authenticates the user to allow the user to unlock the device 100 or to have access to a specific one or more of the applications 150 or functions of the applications 150, depending on the functionality for which the user authentication is initiated. In embodiments, the device 100 verifies that the user has entered characters in a correct order by determining that the user input matches with the characters corresponding to the selected character positions in the user authentication code 160 stored in the memory 140.

In one embodiment, the user authentication code 160 is stored within a look-up table that may identify a list of functionalities for each user, and a user authentication code 160 for each functionality. As used herein, the term functionality may represent the unlocking of device 100, or accessing a specific one or more of the applications 150, or accessing a function within an application 150. The user authentication code 160 stored in the look-up table may be either set by the user, or added by the device 100 and shared with the user. In accordance with embodiments, the user authentication code 160 comprises a sequence of characters that includes numerical only characters (e.g. '0', '1', '2', etc.), alpha numerical characters (e.g. 'a', 'A', '1', 'b', etc.), special characters (e.g. '*', '+', '#', etc.), symbol or sign characters ('a', '∞', 'є', '£', '$', etc.), control characters (e.g., shift, tab, control, etc.), or combination thereof. Each character in the user authentication code 160 is also associated by a respective position. The user authentication code 160 may take form of a password, a passphrase, a personal identification number (PIN) code, a passkey, access code, or any other form of challenge codes that are used to authenticate the user to the device 100. For example, assume that the user authentication code 160, such as a password set by the user to unlock the device 100 is 'as87qw'. In this case, the character i.e. letter 'a' is associated by first character position, letter 's' is associated by second character position, digit '8' is associated by third character position, and so on.

In accordance with some embodiments, the processor 110, instead of requesting the user to enter the entire user authentication code in a standard manner (i.e. entering all the characters corresponding to the user authentication code) during the authentication process, may randomly select one or more character positions from within the stored user authentication code 160 and further requests the user to enter character(s) corresponding to only the selected character positions. In this case, the user is successfully authenticated to the device 100 only when the characters in the user entry match the characters corresponding to the selected character positions of the user authentication code 160 stored in the memory 140. For example, assume that the user authentication code 160, such as a PIN code stored corresponding to a user is '5927', and the user is requested to enter characters corresponding to first and third character positions. In this case, the device 100 successfully authenticates the user only when the user entry includes '5' corresponding to the first character position and '2' corresponding to the third character position. In accordance with some embodiments, the device 100 will not authenticate the user even when the user entry includes all the characters of the user authentication code correctly, however, the user is successfully authenticated only when the characters corresponding to the selected character positions are entered correctly. In another embodiment, the device 100, instead of requesting the user to enter the exact character as corresponding to the selected character positions, may request the user to enter one or more characters on the touch screen 130 as a function of the selected character positions. For example, the device 100 may request the user to enter a sum of the characters corresponding to the first and third character positions. In this case, the device 100 successfully authenticates the user only when the user entry includes '7' which is the sum of '5' and '2' corresponding to the first and third character positions, respectively.

In accordance with some embodiments, the processor 110 initiates the authentication process when a trigger for user authentication is detected. The trigger is generated as a result of detecting a pre-defined user input such as one or more specific actions or gestures from the user. For example, the authentication process may be triggered by the detection of a user input such as a pressing or tapping by a user of a dedicated button or key or interface provided for unlocking the device 100 or applications 150 or functions of an application 150. Alternatively, the authentication process may be triggered by the detection of a user input comprising a tapping of a graphical user interface (GUI) specific to a function or application 150 provided on the touch screen 130. Alternatively, the authentication process may be triggered when the device 100 detects a predetermined pattern of transition in the movement, orientation, temperature, ambience of the device 100, and other parameters requiring pre-emption of the user authentication process at the device 100.

In some embodiments, the memory 140 further stores a pressure profile 170 for each user authentication code 160 stored in the memory 140. The pressure profile 170 comprises a predetermined pressure metric for each character present in the user authentication code 160. The predetermined pressure metric, for example, may be pre-set by the user of the device. In one embodiment, the pressure metric corresponding to each character may be represented as high pressure, medium pressure, or low pressure levels. In accordance with some embodiments, the processor 110 expands the user authentication process to challenge the user in not only providing a response according to the requested character positions, but also further checks the pressure with which the characters corresponding to the requested character positions are entered on the touch screen 130. In particular, when the user authentication process is initiated, the processor 110 selects one or more characters from within the stored user authentication code 160 and further requests the user to enter a character corresponding to each of the selected character positions. In one embodiment, the processor 110 requests the user to enter a character by providing a user prompt or user notification on the display 120, wherein the user prompt or user notification includes an authentication challenge that identifies the selected character positions. When a user entry using a keypad on the touch screen 130 is detected, the processor 110 determines whether the user entry matches the characters corresponding to the selected character positions within the stored user authentication code 160. When the user entry matches the characters corresponding to the selected character positions within the stored user authentication code 160, the processor 110 obtains one or more pressure metrics for the user entry based on the pressure applied to the touch screen 130 during the user entry of the characters. The processor 110 then verifies whether the pressure metric obtained for the user entry matches the corresponding pressure metrics maintained in the pressure profile 170 for the user. The processor 110 successfully authenticates the user to the device 100 when it determines that the pressure metric obtained for the user entry matches the corresponding pressure metrics maintained in the pressure profile 170 for the user.

Figure 2A:
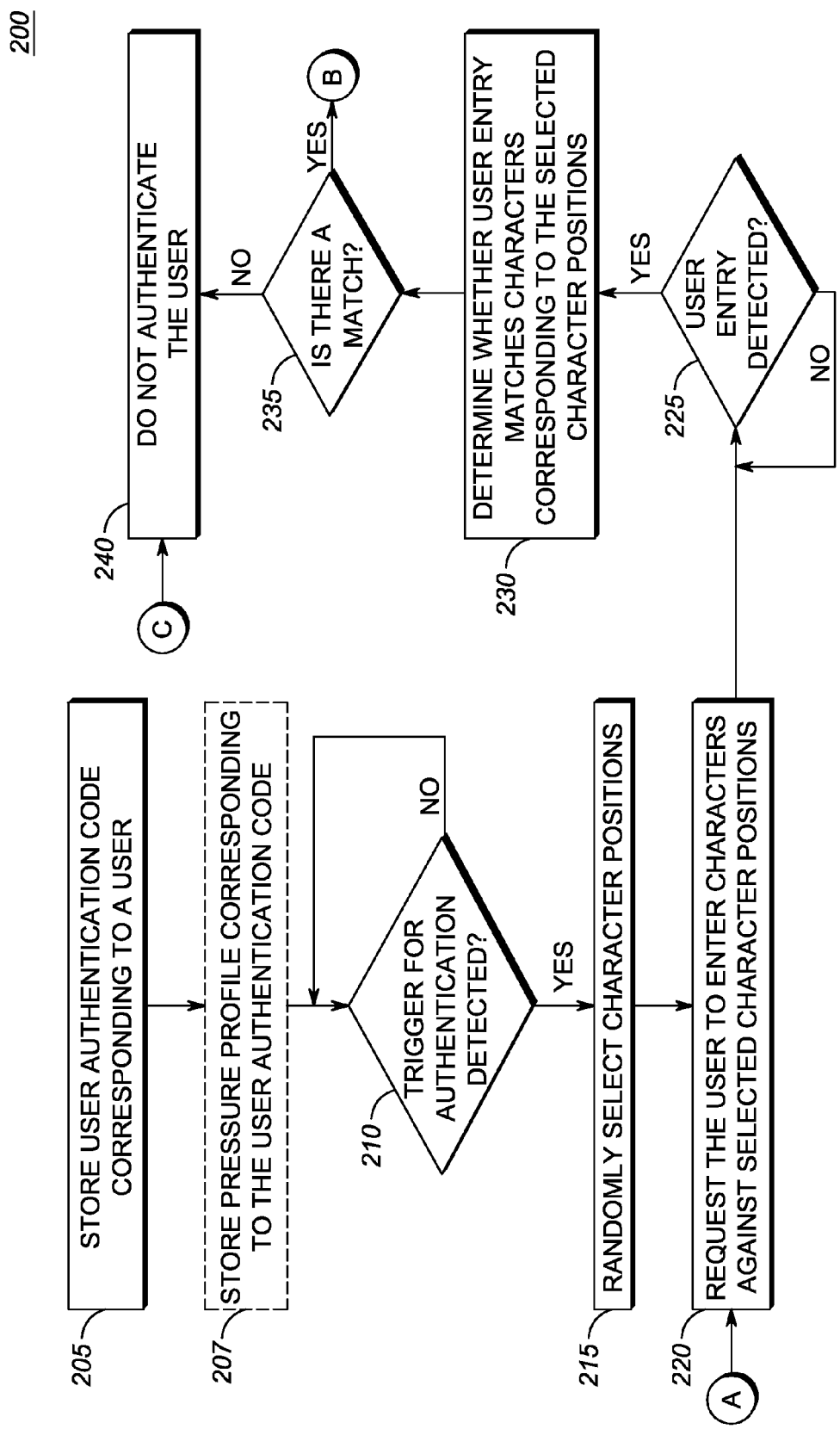
FIGS. 2A and 2B represent a flowchart of a method for user authentication in the device of FIG. 1 in accordance with some embodiments.
Figure 2B:
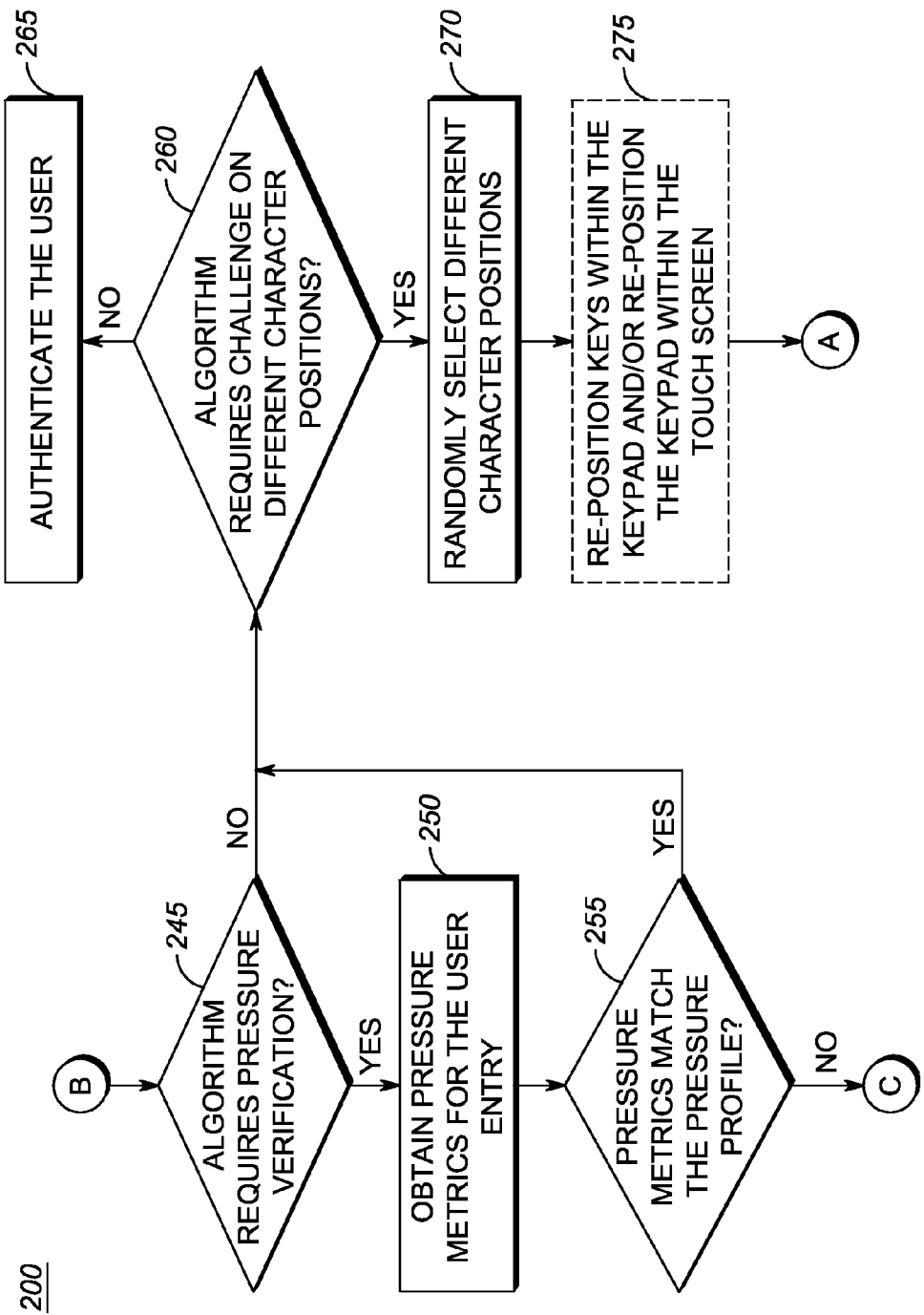

FIGS. 2A and 2B represent a flowchart of a method 200 for user authentication in the device 100 of FIG. 1 in accordance with some embodiments. As shown in FIG. 2A, the method 200 begins by storing a user authentication code 160 corresponding to a user in the memory 140 at block 205. In one embodiment, the user authentication code 160 may either represent a user authentication code set by the user or by the device 100. In one example, the device 100 may prompt the user, for example via the display 120, to set a new authentication node when the device detects that an application 150 is newly installed on the device or when it detects that the application 150 being installed on the device 100 requires the user to set a new authentication code in order for the application 150 to be installed properly. In one embodiment, at block 207, the device 100 further optionally stores a corresponding pressure profile 170 comprising a predetermined pressure metric for each character provided in the user authentication code 160. Next, at block 210, the device 100 checks whether a trigger for user authentication is detected. In one embodiment, the trigger is generated as a result of detecting a predefined user input such as one or more specific actions or gesture from the user. For example, the specific action or gesture from the user may be related to the user intending to unlock the device 100 or access an application 150 or access a specific function of an application 150. In response to detecting a trigger, at block 215, the device 100 initiates a user authentication process by randomly selecting one or more character positions in the sequence of characters of the stored user authentication code 160 corresponding to the user. In accordance with some embodiments, the random selection of character positions from within the stored user authentication code 160 ensures that the user is not entering the same characters (i.e. same keys) on the touch screen 130 for every authentication process. Since the implementation of the embodiments ensures that the user is not using the same set of keys every time an authentication is triggered, the identifying marks pattern formed on the surface of the touch screen 130 is variably distributed throughout the surface of the touch screen, thereby minimizing the possibility for an unauthorized user to discover the user authentication code by the identifying marks pattern.

At block 220, the device 100 requests the user to enter a character corresponding to each of the selected one or more character positions within the stored user authentication code 160. In one embodiment, the device 100 requests the user to enter a character by providing a user prompt or user notification on a display 120, wherein the user prompt or user notification includes an authentication challenge that identifies the selected character positions. In one embodiment, the device 100 may randomly select a particular character position and request the user to specifically enter a character corresponding to the selected particular character position. In one embodiment, the device 100 may randomly select multiple character positions and request the user to enter the characters corresponding to the selected character positions. In this embodiment, depending upon the implementation, the device 100 may request the user to enter the characters corresponding to the selected character positions in either a random sequence or according to a predetermined sequence indicated by the device 100. In accordance with the embodiments, the device 100 may randomly select a different set of character positions within the stored user authentication code 160 each time a trigger for user authentication is detected. For example, this random selection of different set of character positions each time user authentication is triggered ensures that the identifying marks left on the touch screen 130 is spread across different keys of the keypad and further minimizes the possibility of an unauthorized user to discover the user authentication code.

The device 100 after requesting the user to enter characters of the user authentication code corresponding to the selected character positions, checks at block 225 whether it has detected any user entry that was made using a keypad on the touch screen 130. When the device 100 detects a user entry, at block 230, the device 100 determines whether the user entry matches a character corresponding to each of the selected one or more character positions within the stored user authentication code 160. At block 235, when the device 100 determines that there is no match between the character entered during the user entry and the character corresponding to the selected character position from within the stored user authentication code, then the device 100 does not authenticate the user as shown at block 240. In one embodiment, the device 100 may provide a visual indication to the user, for example, via the display 120 that the user has entered incorrect user authentication code. In this case, the device 100 may provide another opportunity for the user to complete the user authentication process by repeating the steps shown from block 215 for a different authentication challenge i.e. user authentication code characters corresponding to different set of character positions. In accordance with some embodiments, when the device 100 does not authenticate the user at block 240, one or more functionalities of the device 100 will be unavailable to the user.

Returning to block 235, when the device 100 has verified that each character entered during the user entry matches with the character corresponding to the selected character positions within the stored user authentication code 160, then the operation within the device 100 proceeds to block 245 (see FIG. 2B) to check whether the algorithm for user authentication process includes pressure verification process. When the pressure verification process is not required, the operation within the device 100 proceeds to block 260 to determine whether the algorithm for user authentication process requires challenging the user on different character positions.

Otherwise, at block 265, the device 100 successfully authenticates the user and provides access of one or more functionalities of the device 100 to the user. When the user authentication process requires challenging the user on different character positions, the operation within the device 100 proceeds to block 270 to randomly select one or more different character positions (i.e. set of character positions that are different from the character positions previously selected by the device 100 at block 215 for challenging the user) within the stored user authentication code 160. Then the device 100 repeats the above described operations of the method 200 so as to challenge the user to enter characters corresponding to different set of character positions within the stored user authentication code 160.

In one embodiment, as shown in block 275, the device 100 re-positions one or more keys from an original location to a different location within the keypad of the touch screen 130 prior to requesting the user (at block 220) to enter characters corresponding to the different set of character positions. As shown in block 275, the device 100 may also further reposition the keypad from an original location to a different location on the touch screen 130 prior to requesting the user (at block 220) to enter characters corresponding to the different set of character positions. In accordance with some embodiments, the repositioning of keys within the keypad or location of keypad within the touch screen 130 further distributes the area in which the identifying marks pattern is formed on the surface of the touch screen 130. This repositioning of keys and/or the location of the keypad can obscure user authentication codes even in situations where the device 100 has selected and requested characters to be entered for same characters positions over a time period. In these situations, the relocation of keys and/or keypad within the touch screen 130 ensures that the user is not leaving identifying marks on the same area again and again, and therefore making it difficult for an unauthorized user to discover the user authentication code.

Returning to block 245, when the device 100 determines that the algorithm for user authentication process also includes the pressure verification process, the operation within the device 100 proceeds to block 250 to obtain one or more pressure metrics for the user entry detected at block 225. The pressure metric indicates a pressure applied to the touch screen 130 during the user entry of a character entered for the corresponding one of the selected one or more character positions. Next, at block 255, the device 100 determines whether the pressure metric for a character entered for each of the selected one or more character positions matches with the pressure profile 170 stored for the corresponding one of the selected one or more character positions. When the pressure metric for a character does not match the pressure profile 170 stored for the corresponding character position, the device 100 does not authenticate the user as shown in block 240 in FIG. 2A. Otherwise, when the pressure metric matches the pressure profile 170, the operation within the device 100 proceeds to block 260 as described above to check whether the algorithm for user authentication process requires the user to be challenged on different character positions. When the algorithm does not require challenging the user on different character positions, the device 100 successfully authenticates the user as shown in block 265.

In one embodiment, the device 100 generates a mathematical function (not shown) and further determines a resultant character for each of the character positions selected at block 215 by applying the mathematical function to each of the selected character positions within the stored user authentication code 160. In this embodiment, the device 100, instead of requesting the user to enter the exact characters as corresponding to the selected character positions, requests the user to enter a character for each of the selected character positions by applying the mathematical function to each of the selected character positions. When the user entry is detected, the device 100 determines whether the user entry matches the resultant character that was earlier determined by the device 100 for each of the selected character positions. In this case, the device 100 authenticates the user only when the user entry matches the resultant character for each of the selected character positions.

Some examples of mathematical functions that are generated by the device 100 include a sequence function, a reverse function, a sum function, and a time function. When the sequence function is generated, the device 100 requests the user to enter a character corresponding to the selected character positions according to a particular sequence. For example, assume that the user authentication code 160 set by the user is '5927' (at block 205) and the device 100 has randomly selected second and fourth character positions (at block 215). In this case, the sequence function may be generated such that the device 100 requests (at block 220) the user to enter a character initially corresponding to the fourth character position within the stored user authentication code 160 followed by a character corresponding to the second character position within the stored user authentication code 160. In this case, the device 100 successfully authenticates (at block 265) the user only when it detects a user entry that includes the characters corresponding to the selected characters positions in the correct sequence i.e. '7' corresponding to fourth character position followed by '9' corresponding to second character position.

When the reverse function is generated, the device 100 requests the user to enter characters corresponding to the selected character positions in a reverse sequence. For example, assume that the user authentication code set by the user is '5927' (at block 205) and the device 100 has randomly selected first, second, and fourth character positions (at block 215). In this case, when the device 100 requests the user to enter characters corresponding to the above selected character positions in a reverse sequence, the device 100 will successfully authenticate the user (at block 265) only when it detects a user entry that includes the characters corresponding to the selected characters positions in the reverse sequence i.e. '7' corresponding to the fourth character position followed by '9' corresponding to the second character position which is further followed by '5' corresponding to the first character position.

When a sum function is generated, the device 100 requests the user to enter a character that is equal to a sum of characters corresponding to the selected character positions. For example, assume that the user authentication code set by the user is '5927' (at block 205) and the device 100 has randomly selected first, second, and fourth character positions. In this case, when the device 100 requests the user to enter a character corresponding to the above selected character positions according to the sum function, the device 100 successfully authenticates (at block 265) the user only when it detects a user entry that includes the sum of characters corresponding to first, second, and fourth positions (i.e. '21', which is the sum of '5', '9', and '7'). As described above, the device 100 matches the character(s) (at blocks 230 and 235) in the user entry and verifies whether the character(s) matches the resultant character previously computed by the device 100 by applying the sum function to the selected character positions.

When a time function is generated, the device 100 requests the user to enter characters corresponding to the selected character positions simultaneously or substantially simultaneously using the keypad on the touch screen 130. For example, assume that the user authentication code set by the user is '5927' (at block 205) and the device 100 has randomly selected first, second, and fourth character positions. In this case, when the device 100 requests the user to enter a character corresponding to the above selected character positions according to the time function, the device 100 successfully authenticates (at block 265) the user only when it detects a simultaneous user entry of the characters '5', '9', and '7' (corresponding to the selected character positions) on the touch screen 130.

FIGS. 3A through 3F show examples of different authentication challenges provided to a user for entering a user authentication code 160 such as a PIN code on a touch screen 130 of the device 100 during user authentication process in accordance with some embodiments. The examples of authentication challenges in FIGS. 3A through 3F are illustrated by different blocks 310, 320, 330, 340, 350, and 360, respectively each representing a display 120 having an integral touch screen 130 (see FIG. 1). The touch screen 130 in each of the blocks 310, 320, 330, 340, 350, and 360 further include a keypad comprising 12 keys arranged in 4 rows of 3 columns representing numeric (0-9) and special characters (*, #). Referring to an authentication challenge shown in block 310 of FIG. 3A, the display 120 shows 'Enter $3^{rd}$ digit of your PIN' suggesting that the device 100 has randomly selected the third character position of the PIN code to challenge the user during the user authentication process. In other words, in accordance with the embodiments, the device 100, instead of requesting the user to enter all the characters of the user authentication code, requests only specific character(s) to be entered. Referring to an authentication challenge shown in block 320 of FIG. 3B, the device 100 requests the user to enter the fourth digit of the PIN, which is different from the character position i.e. third digit previously selected in block 310 of FIG. 3A. In one embodiment, the authentication challenges shown in blocks 310 and 320 may correspond to two independent user authentication requests. For example, the authentication challenge in block 310 may be triggered in response to a pre-defined user input indicating a user attempt to unlock the device 100 and the challenge in block 320 may be triggered in response to a pre-defined user input indicating an attempt to open an application 150. In another embodiment, the authentication challenges in block 310 and 320 may correspond to the same user authentication request, wherein the device 100 has selected two character positions (third and fourth digits of the user authentication code 160) and requests the character to be entered for the subsequent character position (i.e. user authentication code character corresponding to the fourth digit) only when it detects a user entry that includes a correct character for the previous character position (i.e. user authentication code character corresponding to the $3^{rd}$ digit). Further as shown in the authentication challenge of block 320, the device 100 has also re-arranged the order of the keys within the keypad. In accordance with the embodiments of the present disclosure, the challenges shown in block 310 and 320 ensure that the user is not entering the same character each time, and the change in the order of keys within the keypad further ensures that the user is not repeatedly using the same portion of the touch screen 130 to input the user authentication code characters.

Referring to the challenge shown in block 330 of FIG. 3C, the device 100 selects more than one character positions (third and fourth digits) at a time and requests the user to enter the characters corresponding to the selected character positions. In one embodiment, the device 100 enforces a particular sequence in which the characters are to be entered corresponding to the selected character positions in order for the user to be successfully authenticated. In another embodiment, the device 100 may not enforce any sequence, wherein the user is successfully authenticated as long as the detected user entry includes the correct characters (corresponding to the requested character positions) irrespective of the sequence in which the characters are entered. In the authentication challenge shown in block 330, it is further shown that the keys are not ordered within the keypad as per the standard order.

Referring to the authentication challenge shown in block 340 of FIG. 3D, the implementation of a sequence function is illustrated. In this challenge shown in block 340, the device 100 selects multiple character positions (first, second, third, and fourth digits of the user authentication code 160) and requests the user to enter characters corresponding to the multiple character positions according to a sequence function that is generated and displayed to the user via the display 120. In this example, the device 100 requests the user to enter the characters in the sequence of $3^{rd}$, $4^{th}$, $1^{st}$, and $2^{nd}$ digits of the PIN. In this case, the device 100 will successfully authenticate the user only when it detects a user entry that includes the characters corresponding to the selected character positions as per the requested sequence. Otherwise, the device 100 does not authenticate the user when the characters in the user entry are not entered as per the requested sequence. Referring to the authentication challenge shown in block 350 of FIG. 3E, the implementation of a reverse function is shown. In this case, the device 100 requests the user to enter the characters corresponding to the selected character positions in reverse sequence. In block 350, the display 120 shows "Enter your PIN in reverse" which suggests that the device 100 has selected all character positions of the PIN. The user will be successfully authenticated to the device 100 only when it detects a user entry that includes the characters of the PIN in reverse sequence. In this example, it is further shown that the keys within the keypad are re-arranged.

Referring to the authentication challenge shown in block 360 of FIG. 3F, the implementation of a time function is shown. In this case, the device 100 requests the user to enter the characters corresponding to the selected character positions (first and fourth digits) simultaneously on the touch screen 130. In this case, the device 100 not only checks whether the user entry includes the correct characters, but also whether simultaneous user entry of the characters corresponding to the selected character positions is detected. Block 360 also shows the keys being re-arranged within the keypad.

Accordingly, various embodiments described above can be advantageously implemented on devices employing touch screens to perform user-to-device authentication. Embodiments of the present disclosure describe several means by which the user can be challenged to enter user authentication codes on a touch screen in order to unlock the device or provide user with access to specific applications or functions of the device. Implementation of the embodiments of the present disclosure for user authentication protects the user against inadvertent disclosure of the user authentication code due to identifying marks such as smudges left by a finger on the touch screen as a result of the pin entry. In particular, the user authentication process described with reference to FIGS. 1-3 minimizes the value of any evidence of prior entry left on the touch screens by changing the presentation of the authentication user interface to ensure that the locations touched on the touch screen on prior entries does not disclose the characters entered on prior occasions. This is ensured by randomly selecting the character positions and requesting the user to enter only those characters corresponding to the selected character positions. The evidence of prior entry is further minimized by randomizing the sequence in which the characters corresponding to the selected character positions are requested to be entered during the user authentication process. Other implementations such as re-arranging the order of the keys within the keypad and changing the location of the keypad within the touch screen also ensure that the user is not repeatedly using the same portion of the touch screen surface, thus rendering the locations on the touch screen touched during prior entries irrelevant to the locations that need to be touched on future entries. Embodiments of the present disclosure also improves the efficiency of user authentication process by directly storing the user authentication code set by the user or device in the memory of the device itself, and therefore does not require access to a back-end system such as a server (or wired or wireless communication resource) to complete the user authentication process. Therefore, the implementation of the various embodiments of the present disclosure protects the user from inadvertent disclosure of user authentication code due to identifying marks left on the screen.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for user authentication in a device comprising a touch screen, the method comprising:

storing, by the device, a user authentication code corresponding to a user, wherein the user authentication code comprises a sequence of characters, and further wherein the characters are associated by respective character positions;

selecting, by the device, a set of a plurality of character positions in the sequence of characters each time a trigger for user authentication is detected;

in response to detecting a trigger for user authentication, requesting, by the device, the user to enter one or more characters, wherein each of the one or more characters is determined as a mathematical sum of a plurality of the characters of the selected set of character positions;

detecting, by the device, a user entry made using a keypad on the touch screen;

determining, by the device, whether the user entry matches the one or more characters that are determined as the mathematical sum of the selected set of character positions in the sequence of characters; and successfully authenticating the user to the device when the user entry matches one or more characters that are determined as a mathematical sum of the selected set of character positions in the sequence of characters.

2. The method of claim 1, wherein the sequence of characters includes numeric only characters, alphanumeric characters, special characters, symbol or sign characters, control characters, or combination thereof.

3. The method of claim 1, further comprising repositioning the keypad from an original location to a different location on the touch screen prior to requesting the user to enter the one or more characters.

4. The method of claim 1, further comprising repositioning one or more keys from an original location to a different location within the keypad prior to requesting the user to enter the one or more characters.

5. The method of claim 1, wherein after successfully authenticating the user to the device, and in response to detecting a trigger for another user authentication, the method further comprising:

randomly selecting, by the device, a different set of a plurality of character positions in the sequence of characters;

requesting, by the device, the user to enter a one or more characters, wherein each of the one or more characters is determined as a function of the selected different set character positions;

detecting, by the device, a user entry made using the keypad on the touch screen;

determining, by the device, whether the user entry matches the one or more characters that are determined as a function of the selected different set of character positions; and successfully authenticating the user to the device when the user entry matches one or more characters that are determined as a function of the selected different set of character positions in the sequence of characters.

6. The method of claim 1, wherein prior to successfully authenticating the user to the device, the method further comprising:

storing, by the device, a pressure profile corresponding to the user authentication code;

obtaining, by the device, one or more pressure metrics for the user entry, each pressure metric indicating a pressure applied to the touch screen during the user entry of a character;

determining, by the device, whether the pressure metric for a character entered matches with the pressure profile; and successfully authenticating the user to the device when the pressure metric matches with the pressure profile.

7. The method of claim 1, wherein the device is at least one of a mobile computer, a desktop computer, a laptop or notebook computer, a handheld device, an automated teller machine, a kiosk, a vending machine, a two-way radio, a payment machine, and a facsimile machine.

8. The method of claim 1, wherein requesting the user to enter a character corresponding to each of the selected one or more character positions in the sequence of characters comprises randomly selecting a sequence in which the character is to be entered corresponding to each of the selected one or more character positions in the sequence of characters, and requesting the user to enter a character corresponding to each of the selected one or more character positions according to the selected sequence.

9. A user device comprising:

a processor; and a memory that is configured to store a user authentication code corresponding to a user, wherein the user authentication code comprises a sequence of characters and wherein the characters are associated by respective character positions, and wherein the memory further is configured to store a set of instructions that, when executed by the processor, cause the processor to perform the functions of:

select a set of a plurality of character positions in the sequence of characters each time a trigger for user authentication is detected;

in response to detecting a trigger for user authentication, request the user to enter one or more characters, wherein each of the one or more characters is determined as a mathematical sum of a plurality of the characters of the selected set of character positions;

detect a user entry made using a keypad on the touch screen;

determine whether the user entry matches the one or more characters that are determined as the mathematical sum of the selected set of character positions in the sequence of characters; and successfully authenticate the user to the device when the user entry matches one or more characters that are determined as a mathematical sum of the selected set of character positions in the sequence of characters.

10. The user device of claim 9, wherein the memory further is configured to store a set of instructions that, when executed by the processor, cause the processor to perform the functions of:

after successfully authenticating the user to the device, and in response to detecting a trigger for another user authentication, randomly select a different set of a plurality of character positions in the sequence of characters;

request the user to enter one or more characters, wherein each of the one or more characters is determined as a function of the selected different set character positions;

detecting, by the device, a user entry made using the keypad on the touch screen;

determining, by the device, whether the user entry matches the one or more characters that are determined as a function of the selected different set of character positions; and successfully authenticating the user to the device when the user entry matches one or more characters that are determined as a function of the selected different set of character positions in the sequence of characters.

11. The user device of claim 9, wherein the user device is at least one of a mobile computer, a desktop computer, a laptop or notebook computer, a handheld device, an automated teller machine, a kiosk, a vending machine, a two-way radio, a payment machine, and a facsimile machine.

* * * * *